United States Patent [19]
Barkalow et al.

[11] Patent Number: 5,136,976
[45] Date of Patent: Aug. 11, 1992

[54] METHOD AND MEANS FOR CONTROLLED-PROFILE COATING OF GLASS CONTAINERS

[75] Inventors: Rayond W. Barkalow, Jackson; Roger T. Guthrie, Spartanburg, S.C.

[73] Assignee: Atochem North America, Inc., Philadelphia, Pa.

[21] Appl. No.: 427,662

[22] Filed: Oct. 27, 1989

[51] Int. Cl.$^5$ .................................................. C23C 16/00
[52] U.S. Cl. ........................................ 118/715; 427/255
[58] Field of Search ................ 427/255; 118/715, 725, 118/719

[56] References Cited

U.S. PATENT DOCUMENTS

| | | | |
|---|---|---|---|
| 3,516,811 | 6/1970 | Gatchet | 427/255 |
| 4,431,692 | 2/1984 | Hofmann | 427/255 |
| 4,529,627 | 6/1985 | Zurbig | 427/255 |
| 4,615,916 | 10/1986 | Henderson | 427/255 |

Primary Examiner—Richard Bueker
Attorney, Agent, or Firm—Stanley A. Marcus; Robert B. Henn

[57] ABSTRACT

Apparatus for the coating of glass containers has a series of vertical slots for applying coating chemicals to a hot glass jar with a minimal neck and shoulder area. An opposing horizontal slot exhausts spent coating material and reactants in a laminar flow. A center section provides a current of gas without chemicals parallel to the coating stream, and flowing with low velocity relative to the coating stream, but with high velocity relative to the extraneous turbulent and convection currents.

12 Claims, 5 Drawing Sheets

METHOD AND MEANS FOR CONTROLLED-PROFILE COATING OF GLASS CONTAINERS

BACKGROUND OF THE INVENTION

1. Field of the Invention

This invention is in the field of methods and apparatus for the application of coatings to glass containers. More particularly, the present invention is in the field of methods and devices for the application of coatings of varying thicknesses to bottles, jars and the like, where the distance between the closure region and the shoulder of the container is minimal.

2. Description of the Prior Art

The utility of glass bottles and jars has been broadened by surface coating to decrease abrasion and breakage, as taught by Carl, et al., U.S. Pat. No. 3,323,889; Gatchet, et al., U.S. Pat. No. 3,516, 811; Scholes, et al., U.S. Pat. No. 3,819,404; Hofmann, et al., U.S. Pat. No. 4,431,692; Lindner, et al., U.S. Pat. No. 4,668,268, and others. Gatchet observed the utility of avoiding all coating on the closure region of the container, known in the art as the "finish" region of the container. In U.S. Pat. No. 4,431,692, Hofmann taught maintaining the finish out of contact with the treatment gas. Several of the prior workers in this field have recognized the existence of non-linear currents in the coating-precursor stream, including omnidirectional turbulent currents and upwardly-moving convection currents.

It is known in the art of glass manufacture that uncoated glass is generally unsuitable for handling in high-speed operations because its brittleness renders the surface susceptible to potentially catastrophic damage. Specifically, bottles and other glass containers made in large numbers are susceptible to breakage in the course of being transferred through various manufacturing steps, or during a subsequent filling operation.

In order to minimize the problems thus encountered, a number of treatments have been applied to the containers as they are manufactured. Such treatments include, e.g., spraying with lubricant such as a wax or fatty acid, and applying reactive coatings by chemical-vapor-deposition (CVD) or spray pyrolysis methods.

Treatment by CVD typically can involve propelling a vapor of metal-containing species onto the hot glass-container surface to produce a thin layer of metal oxide, typically stannic or titanic oxide. This metal-oxide layer anchors the waxy lubricant which is added after annealing. Without the metal-oxide layer, such waxy lubricants do not adhere well to glass under the conditions encountered in a wet filling line.

In U.S. Pat. No. 4,668,268, assigned to the same assignee as the present invention, Lindner et al. teach the application of a metal-containing compound, generally an organotin material, to the surface of a glass container immediately after that container has acquired sufficient mechanical integrity to maintain its shape on a material-handling line. The Lindner et al. disclosure describes a coating hood for applying a uniform protective coating to a glass container as the container is transported by material-handling means, generally a conveyor belt, after its formation from molten glass. The described coating hood comprises a pair of side walls with a coating jet in at least one of the walls, and an exhaust system to remove the process stream from the coating zone.

In the field relating to the coating of containers generally and glass bottles specifically, one problem which is repeatedly encountered is that of applying adequate material to the body of the container while keeping the area near the open end of the container untreated. The open end has a structure to accommodate a closure such as a cap with screw threads or a gasketed lid for a friction or vacuum seal. This portion of the container is referred to in the art as the "finish" of the bottle or jar.

It is desirable to maintain the finish portion of the container relatively free of coating material for reasons of both chemical and physical importance. Where an improperly oxidized tin compound is deposited on the screw threads of, for instance, a jar for holding baby food, the chemical, electrochemical or mechanical interaction between the metal cap and the coating may be sufficient to discolor the glass or corrode the metal. Another disadvantage of coating on the finish is the possible effect on the frictional interaction between the glass and the cap or other closure; low friction can permit leakage, while too high a frictional value can impede both placement and removal of the closure. In either case, the utility of the treated container is adversely affected.

In the art of coating glass containers, the film deposited onto the glass surface is measured in arbitrary coating-thickness units (CTU), the unit thickness being about 2.5 Angstroms (Å); tin-oxide coatings of from about 30 to 40 CTU's, or about 75 to 100 Å, may be required for the body of the container, while acceptable coating on the finish may be one-half or even one-tenth of this amount, depending upon the ware and its intended use. While manufacturers of baby food state a preference for finish coating of less than half the shoulder coating, proximity of finish to shoulder has heretofore made the desired separation difficult or impossible to achieve under the teachings of the prior art.

The improvement in the art which Lindner et al. provided in partial response to the problem of differential wall and finish thickness was accomplished by directing a stream of air, in which no coating material was entrained, onto the finish in order to displace and dilute coating material which would otherwise coat the finish region almost as much as the shoulder or the body of the container. By selection of the geometry of the coating hood as a function of the containers to be coated, Lindner et al. were able to effect acceptable coating thickness on the sidewalls, concomitant with protection of the finish for the large volume of glass containers having necks of appreciable length.

However, the utility of the apparatus of the Lindner et al. patent is only marginal for applications such as food and cosmetic bottles and jars having very short or non-existent necks. The latter group comprises, e.g., jam, jelly and cold-cream jars, and containers for baby foods, peanut butter, thixotropic salad dressings, and the like.

While the most effective prior art directs the vapor-laden air stream horizontally at the label panel of the ware, and a stream of vapor-free air at the finish region, some of the coating stream has been found inevitably to be displaced toward the finish by conditions within the coating hood. Displacement can originate, e.g., in the shearing interaction between adjacent coating streams traversing the hood in opposite directions; in the turbulence caused by the ware as it crosses the coating streams; in the strong convection currents caused by hot ware moving through a coating stream that is typically hundreds of degrees cooler than the ware; and in the induced draft caused by the finish-protection stream.

An objective of the current invention is minimization of the vertical displacement of the essentially horizontal coating stream. A further objective is utilization of this essentially horizontal coating stream to provide adequate coating for baby-food jars and other substantially non- or short-necked ware, typically defined to include a coating thickness on the finish of less than half the coating thickness on the sidewall.

The objective is achieved by separate coating zones for opposing sides of the ware, to minimize shearing interaction; and by two or more finish-protection (i.e., non-treating) process streams, or fresh air, traveling above and essentially parallel with the two or more coating streams, the finish-protection streams having sufficient velocity to dilute and displace any coating vapors that may be approaching the finish because of the convection or turbulence mentioned previously, the non-treating process stream having insufficient velocity to cause induced drafts which are known, in the prior art, to bring coating vapors into the finish zone.

SUMMARY OF THE INVENTION

This invention is an apparatus for the coating of glass containers having a minimal neck region, the apparatus comprising a coating hood with a high-pressure portion and a juxtaposed low-pressure portion, with a center section for the introduction of air which is free of coating precursor, and traveling in essentially the same direction as the coating stream. The apparatus includes means for process-stream transfer and coating-precursor makeup. The invention further includes the article made by the apparatus.

DESCRIPTION OF THE PREFERRED EMBODIMENTS

The preferred embodiment of the present invention is an apparatus for the application of glass-treating material to a glass container having a minimal separation between the body of the container and the top portion, the apparatus comprising coating-supply means and exhaust or recirculation means, the coating-supply means having a plurality of coating-precursor slots on one side of the apparatus and a cooperating low-pressure area on the opposite side, the apparatus having a process-stream-directing means juxtaposed above the container and intermediate the two sides of the apparatus. As more fully described above, the coating-process stream maintains a substantially horizontal direction until it passes the ware. Means are provided for transfer of the process stream from the low-pressure to the high-pressure side of the device, and for makeup as necessary of the coating-precursor material. The invention is an improvement over the prior art, described hereinabove, which comprises at least one coating-precursor supply section in cooperation with at least one opposing exhaust section, and stream-deflection means consisting of a center section providing a stream of vapor-free air moving above and in the same direction as the coating stream.

Figure 1:
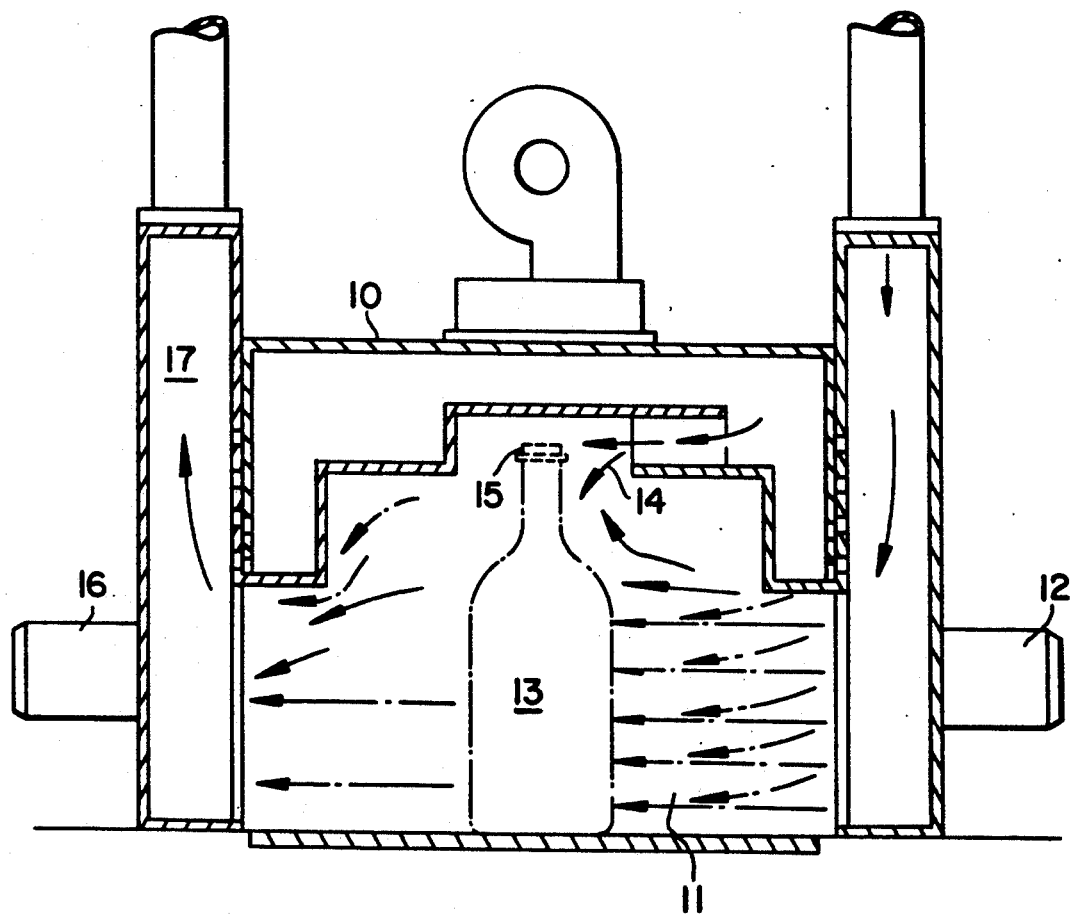
FIG. 1 is an elevation of apparatus of the prior art.

Turning now to the drawings, FIG. 1 is a sectional elevation of the apparatus disclosed by Lindner et al., in U.S. Pat. No. 4,668,268. Briefly described, the Lindner et al. patent shows apparatus for the coating of a container, generally of glass, whereby a process stream 11 under pressure from blower 12 impinges upon bottle 13. Deflection stream 14, flowing substantially in the same direction as stream 11, is intended to keep stream 11 from depositing an undesirably thick coating of material on the finish 15 of bottle 13. Recirculation blower 16 maintains a low pressure within plenum 17 to cause process stream 11 to move onto and around bottle 13, thereby causing the coating precursor to react with the hot surface of the glass substrate. Other portions of the apparatus not germane to this invention are not further described here, being well within the understanding of one skilled in the art.

In the operation of the process of Lindner et al., in coating hood 10, process stream 11 is generally a mixture of glass-coating precursors such as, e.g., an organotin compound in air or a titanium compound. Compounds which are useful with the apparatus of the present invention include those which are capable of reaction with air or other process stream oxidizing moiety to form a metal oxide, and comprise, e.g., organotin compounds generally, monobutyltin trichloride, tin tetrachloride, titanium tetrachloride and tetraisopropyl titanate.

Upon impinging on bottle 13, the organotin is converted to tin oxide as a coating on the glass surface. Volatile products and unreacted chemicals are recirculated by the action of blower 16. While the process stream 11 has a tendency toward turbulence on encountering bottle 13, deflection stream 14 maintains a zone which is essentially, but not perfectly, free of the coating recursor carried in stream 11. As a result, coatings secured by the Lindner et al. apparatus provide a gradient of coating with a thickness of the order of 100 Å on the body of the container to about 10 Å in the finish region. However, in field application, it has not been possible to steepen the gradient, nor to apply the process to the apparatus in a consistently successful fashion to containers with necks shorter than about 25 millimeters (mm).

Figure 2:
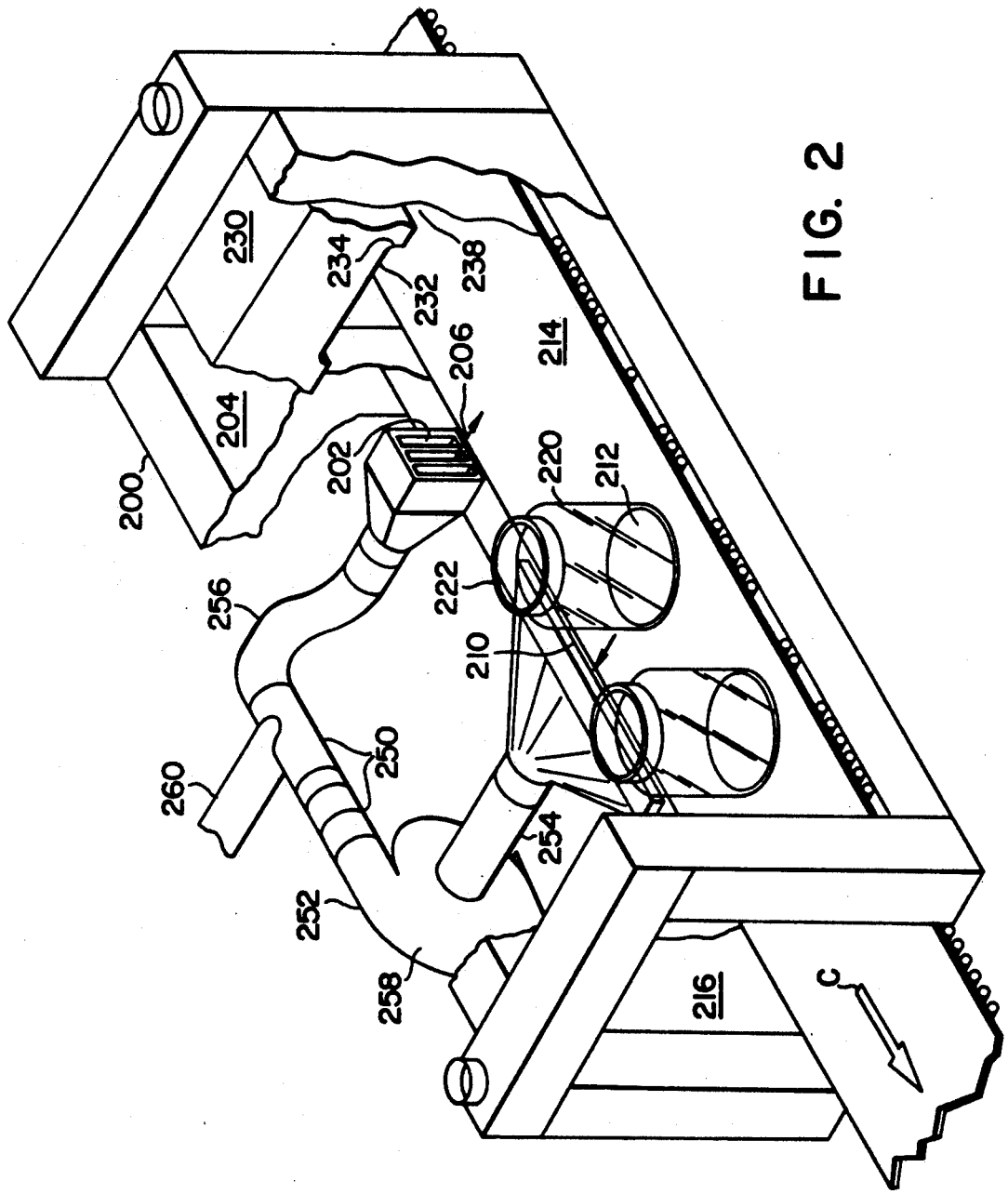
FIG. 2 is partially cut-away perspective view of part of the apparatus of the invention.

FIG. 2 depicts one embodiment of this invention, the apparatus being shown partially in phantom. Coating hood 200 differs from the prior art by minimizing the shearing interaction of adjacent coating and finish-protection streams. This improvement decreases the movement of coating precursor into the finish region by induced drafts and turbulent currents. In the apparatus of this invention, vertical slots 202 in wall 204 provide a substantially laminar process-stream flow 206 across tunnel 216. Wall 204 holds horizontal slot 210, juxtaposed opposite vertical slots 202. While FIG. 2 shows one set of slots 202 and 210, and the apparatus functions acceptably in this embodiment, a plurality of such moieties, preferably disposed opposite each other, is within the spirit and scope of the invention, and both slots 202 and 210 are shown in wall 204 in FIG. 2 for clarity of presentation.

In the operation of this invention, process stream 206 impinges upon container 212 carried on conveyor 214 through tunnel 216 in the direction indicated as C in the drawing; container 212 with body portion 220 and finish region 222 may be at a temperature of about 250 to 315 degrees Centigrade, but in any event at a surface temperature sufficient to cause the reaction at that surface of the coating precursor in the process stream with ambient air in order to provide the desired coating, generally an oxide of tin or titanium. With the exception of the unavoidable deflection of the process stream by the containers 212 moving through the apparatus, the present invention maintains a smooth, laminar, flow of the process stream 206 over the surface of container 212, avoiding the turbulence encountered in the prior art. The process stream is removed through slots 210 and recirculated, as shown in FIGS. 2, 3 and 4.

Although the minimization of turbulent flow of the process stream 206 is an improvement in coating of containers over the prior art, the further use of center section 230 provides even better control over the process stream in the finish region 222 of container 212. Channel or duct portion 232 is adjusted to permit close clearance of container 212, and the size of the channel is chosen to provide clearance between channel 232 and finish region 222 of container 212 with a tolerance of from about 2 to about 5 mm, although such values are not critical to the operation of the invention. Referring to FIG. 3, a fluid 236 not containing coating precursor is urged through slot 239 in a manner such that the direction and velocity of flow does not create turbulence, nor substantially interact, with process stream 206. After traversing the finish region 222 of container 212, fluid 236 leaves the treatment region through exhaust channel 234 while the effluent of process stream 206 is drawn off through slots 210.

Upon traversing the full width of tunnel 216, process-stream flow 206 is optionally at least partially exhausted or gently deflected downward and drawn into low-pressure slot 210; see further the discussion hereinbelow with reference to FIG. 6. By the design set forth herein, there is minimal interaction between process stream 206 and fluid 236 until they are no longer in proximity to the finish region 222 of bottle or jar 212 which therefore remains uncoated by the action of the precursor materials carried in process stream 206. Thus, the action of the fluid 236, generally air, is to preclude reaction on finish region 222 of coating-precursor chemicals carried in process stream 206. By this cooperation of the fluid flow from openings 234 and the flow of process stream 206 from vertical slots 202 into horizontal slots 210, precise coating of container 212 is achieved, depositing sufficient coating on body 220 while minimizing the thickness of coating on finish region 222.

Figure 3:
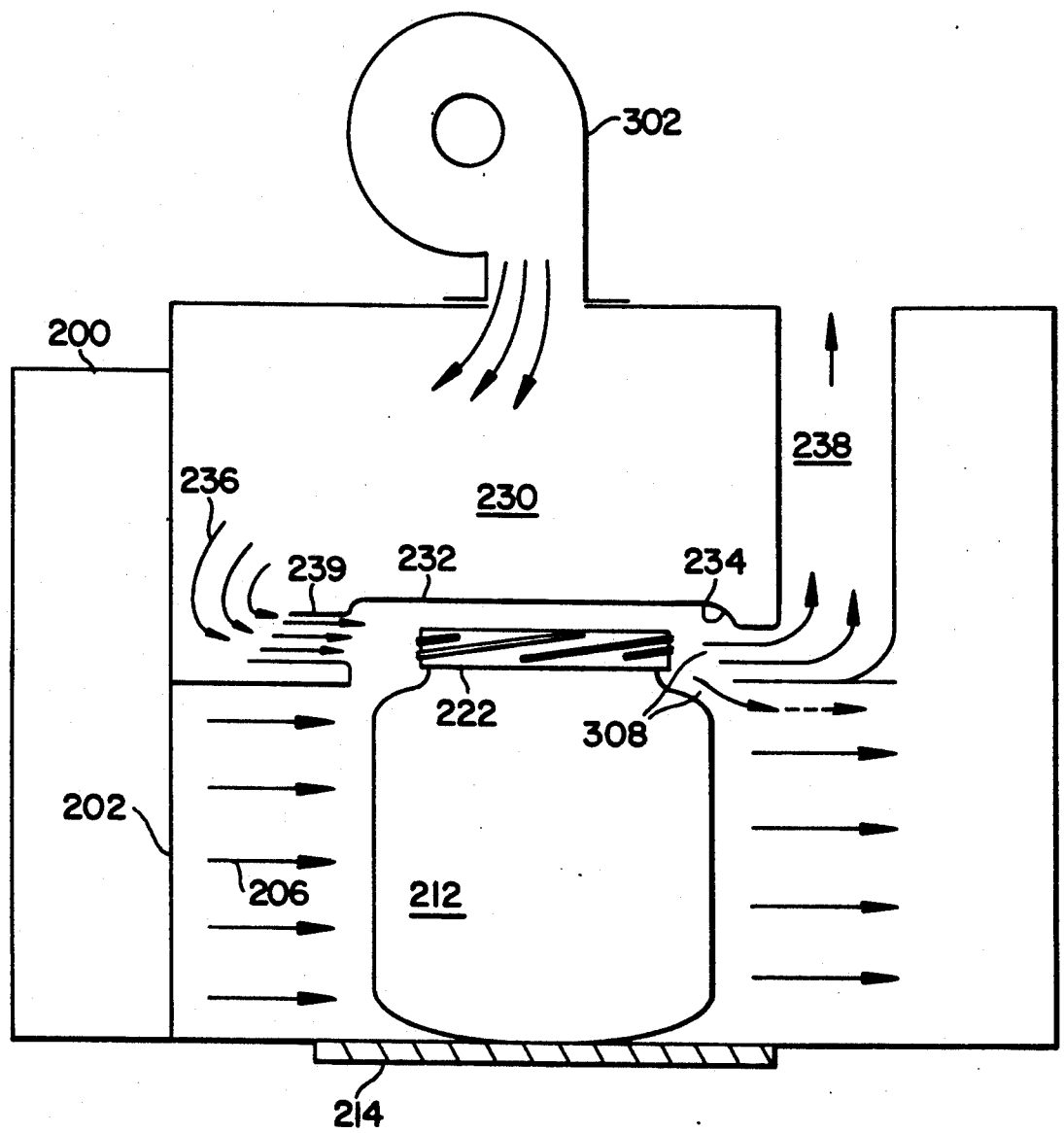
FIG. 3 is an elevation of a portion of the device of this invention.
Figure 4:
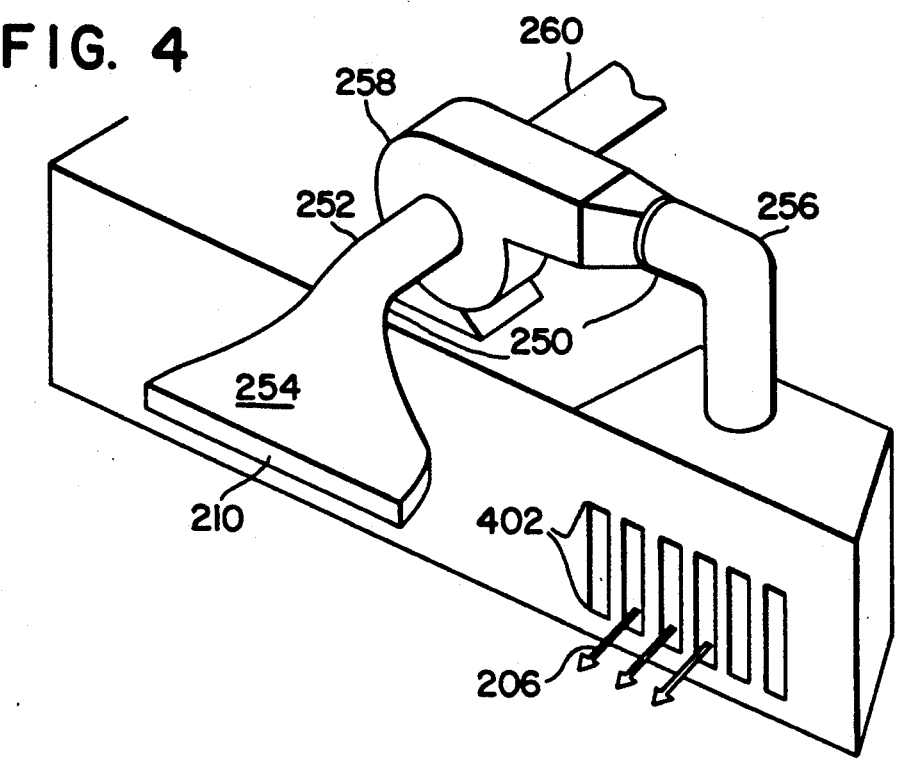
FIG. 4 shows a perspective view of the recirculation loop of the invention.

FIG. 3 shows a greater detail of center section 230 disposed in tunnel 216. Impelled by pressure from blower or other source 302, non-coating fluid stream 236 flows from openings 239 and is directed by the conformation of curvilinear portion 234 as shown by arrows 308. The conformation of the curvilinear portion 234 of channel 232 is preferably complementary with the finish region of the container. After non-coating stream 236 has passed across finish region 222 of container 212, it is given a slight vertical component by the conformation 234 of center section 230; the major portion of stream 236 is then removed through exhaust 238.

FIG. 4 shows wall 204 of the apparatus in greater detail. Recirculation loop 250 comprises a conduit 252 drawing process-stream materials and spent reactants through duct 254 and in turn recycling them by means of duct 256 back through slots 202. Blower or other fluid-motive device 258 serves as the means to move the process and reactant stream; conduit arm 260 provides a make-up port for the introduction of reactants or stream adjustment as may be required to meet process conditions such as line speed, temperature fluctuation, coating-thickness specifications and the like. As discussed in relation to FIG. 2, vertical slots 202 provide a laminar flow of the process stream; the height 402 of slots 202 is conveniently, although not necessarily, chosen to be identical with the height of the body of the container 212 shown in FIG. 2, and less than the height of the finish region of that container. In this fashion, process stream 206 impinges on the body 220, but not on the finish region 222, of container 212. The function of horizontal slots 210 is to remove the spent process stream and reaction by-products without inducing turbulence. It has been surprisingly discovered that by controlling the rate of flow of process stream 206, turbulence is avoided, and the removal of by-products and unreacted material through slots 210 helps to maintain a laminar aspect of that flow; concurrently, by applying a parallel control flow of stream 236 through openings 239 of center section 230, any tendency of the process stream 206 to flow onto or around finish region 212 is minimized almost to the point of exclusion.

Figure 5:
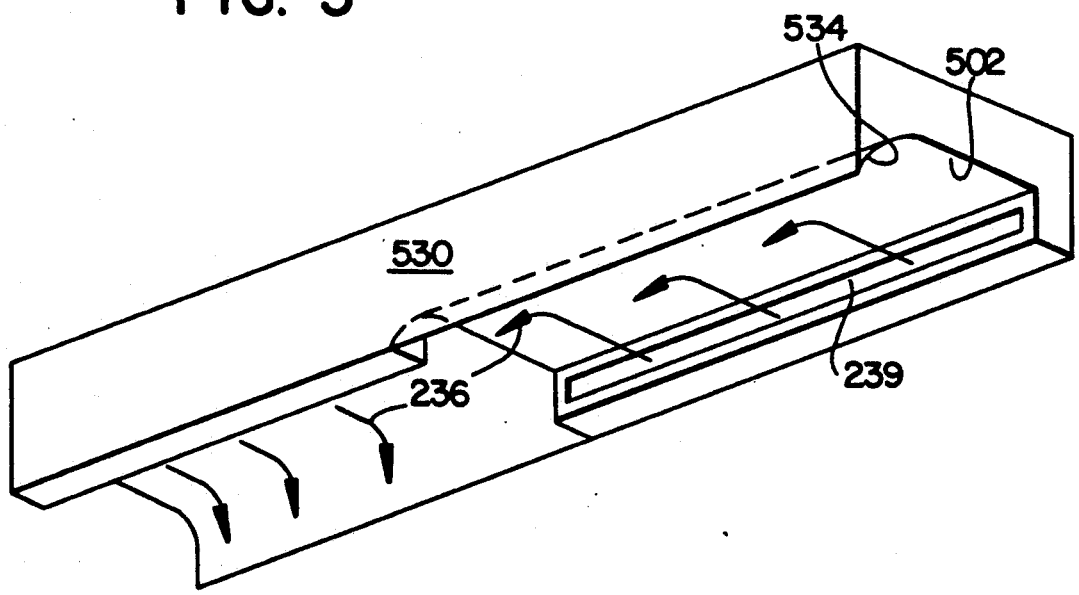
FIG. 5 is a perspective view of the center portion of the invention.
Figure 6:
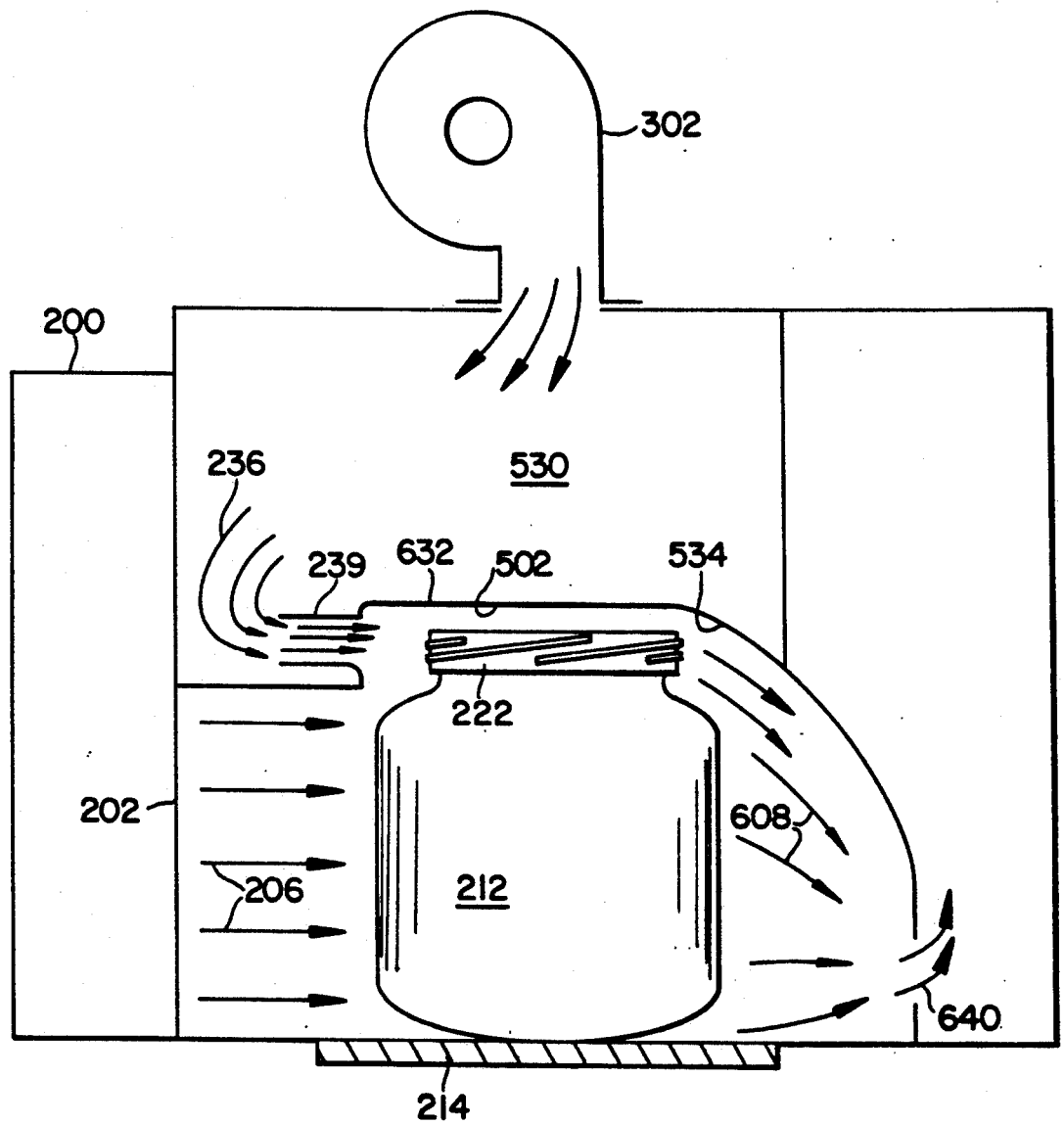
FIG. 6 is another embodiment of the apparatus shown in FIG. 3.

FIGS. 5 and 6 illustrate the function and construction of another embodiment of this invention. In FIG. 5, center section 530 is shown in perspective. Finish-protection stream 236 exits through slot 239, traverses surface 502, and follows conformation 534, the effect of which is to provide the downward vector to maintain finish 222 of container 212 essentially free of coating. From a review of this disclosure, those skilled in the art will recognize that the lower portion of finish-protection stream 236 will become enriched with coating-precursor stream 206 by diffusion, convection, and impingement of coating-precursor stream 206 upon container 212.

FIG. 6 shows center section 530 in coating hood 200. As noted hereinabove with reference to center section 230 of FIG. 3, center section 530 of this embodiment is disposed in tunnel 216. Impelled by pressure from blower or other source 302, non-coating fluid stream 236 flows from openings 239 and is directed by the conformation of curvilinear portion 534 as shown by arrows 608. The conformation of the portion 534 of channel 632 is preferably complementary with the finish region of the container. After non-coating stream 239 has passed across finish region 222 of container 212, it is given a vertical component by the conformation of the curvilinear portion 534 of center section 530. The mixed coating-precursor and finish-protection streams 640 are then recirculated for further application to more containers 212 after the manner noted above in connection with FIG. 2.

Surprisingly to highly skilled professionals who have long sought the sharp coating separation between shoulder and finish only rarely and fleetingly obtainable with apparatus of the prior art, the ordinary worker can now, with the apparatus of the present invention, accurately set the balance of exhausted and recirculated process streams by comparing coating thickness on the shoulder with that on the finish, and then adjusting the apparatus controls to maximize that ratio. In contrast to the apparatus of the prior art, the present invention will maintain the desired ratio almost indefinitely.

Modifications and improvements to the preferred forms of the invention disclosed and described herein may occur to those skilled in the art who come to understand the principles and precepts thereof. Accordingly, the scope of the patent to be issued hereon should not be limited to the particular embodiments of the invention set forth herein, but rather should be limited only by the advance by which the invention has promoted the art.

What is claimed is:

1. In apparatus for coating containers having a minimal distance between the body and the finish region of the container, wherein the apparatus is substantially isolated from the ambient atmosphere and comprises coating-precursor-supply means and exhaust means, the improvement which comprises at least one coating-precursor supply section in cooperation with at least one opposing exhaust section, and stream-deflection means consisting of a center section, the center section providing a stream of vapor-free air moving above and in the same direction as the coating stream.

2. The apparatus of claim 1 having a plurality of coating-precursor supply sections.

3. The apparatus of claim 1 having a plurality of opposing exhaust sections.

4. The apparatus of claim 1 wherein the vapor-free air stream velocity, relative to the coating stream, is substantially zero.

5. The apparatus of claim 4 wherein the stream-deflection means has a channel and a plurality of openings.

6. The apparatus of claim 1 wherein the coating-precursor supply section has a vertical slot.

7. The apparatus of claim 1 wherein the coating-precursor supply section has a plurality of vertical slots.

8. The apparatus of claim 1 wherein the coating-precursor supply section has a plurality of vertical slots, each of the slots being substantially equal to the height of the body of the container.

9. The apparatus of claim 7 having further a vapor-recirculation loop.

10. The apparatus of claim 9 wherein the vapor-recirculation loop includes at least one duct.

11. The apparatus of claim 9 wherein the vapor-recirculation loop further includes fluid-motive means.

12. The apparatus of claim 9 wherein the vapor-recirculation loop further includes a makeup port.

* * * * *